United States Patent [19]

Gluckman

[11] Patent Number: 4,667,645

[45] Date of Patent: May 26, 1987

[54] CONTROL DEVICE FOR DIESEL ENGINE INTAKE AIR HEATER AND PRIMING FLUID INJECTION SYSTEM

[75] Inventor: Dorian Gluckman, Redford Township, Wayne County, Mich.

[73] Assignee: AP Electronics, Inc., Pontiac, Mich.

[21] Appl. No.: 863,959

[22] Filed: May 16, 1986

[51] Int. Cl.[4] ............ F02M 31/02; F02N 17/08
[52] U.S. Cl. .................. 123/552; 123/179 H; 123/180 E; 123/187.5 R
[58] Field of Search .......... 123/179 A, 179 B, 179 H, 123/180 R, 180 AC, 180 E, 187.5 R, 552, 549

[56] References Cited

U.S. PATENT DOCUMENTS

| | | | |
|---|---|---|---|
| 3,656,465 | 4/1972 | Frankle | 123/179 H |
| 4,346,683 | 8/1982 | Burke | 123/180 AC |
| 4,372,261 | 2/1983 | Sarto | 123/179 B |
| 4,404,932 | 9/1983 | Nakamura | 123/179 H |

Primary Examiner—Andrew M. Dolinar
Attorney, Agent, or Firm—Hauke & Patalidis

[57] ABSTRACT

An electronic device controlling the intake manifold heater and priming fluid injection system in diesel engines. The device automatically energizes the intake manifold heater and enables the priming fluid injector in response to electrical signals received from a coolant temperature sensor and a lubricating oil pressure sensor so as to improve cold starting, cold driveability, fuel consumption, gas emissions, and to eliminate white smoke at the exhaust. The device prevents the priming fluid injector from being operated until after the intake manifold heater has cooled to a level preventing ignition of the priming fluid, such as ether, in the intake manifold.

24 Claims, 1 Drawing Figure

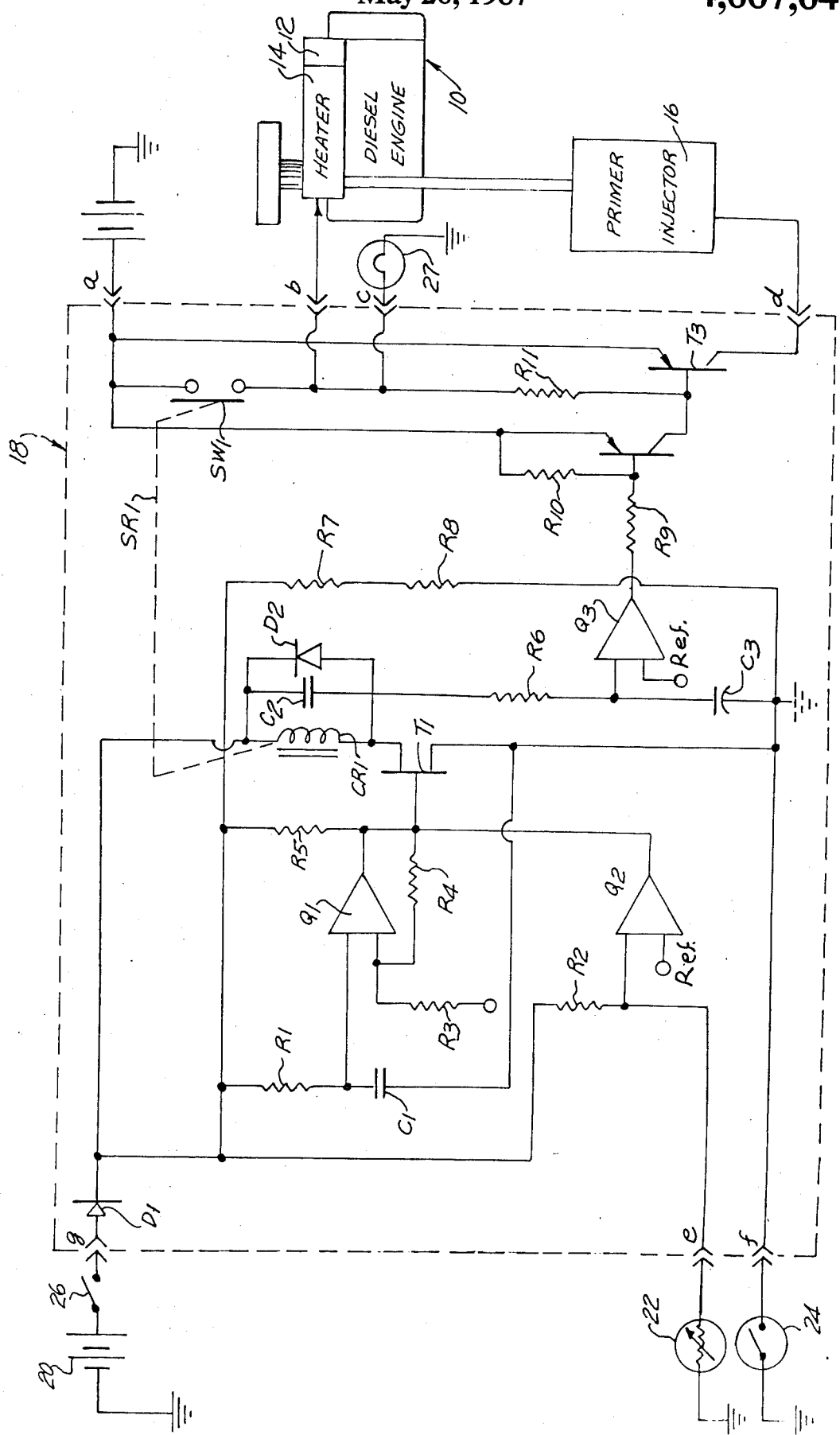

CONTROL DEVICE FOR DIESEL ENGINE INTAKE AIR HEATER AND PRIMING FLUID INJECTION SYSTEM

BACKGROUND OF THE INVENTION

This invention is related to diesel engines having an intake air heater and a primer injection system for a priming fluid, such as ether for example, to assist in starting the engine in cold weather, and more particularly to a device for controlling the energization of the heater and the primer injection system depending upon the pressure of the lubricating oil system and the temperature of the coolant, in such a manner as to prevent intake manifold fire or explosion and to eliminate white smoke at the exhaust of the engine.

Diesel engines, and more particularly large diesel engines such as those used in trucks and buses, are difficult to start in cold weather. They also run very poorly until fully warmed-up. During warm-up, they display poor driveability and high emissions due to incomplete combustion. In particular, white smoke is frequently produced at the exhaust and is undesirable from a functional as well as an aesthetic viewpoint.

The cold starting problems have been addressed by various starting aids, most of which use a primer fluid injection system. The white smoke problem is a relatively recent concern relating particularly, but not exclusively, to turbocharged engines. The white smoke problem has not been addressed by previous devices.

SUMMARY OF THE INVENTION

The principal object of the present invention is to provide an electronic device for controlling a high-powered electrical heater mounted in the intake manifold of a diesel engine, and also for controlling the operation of the priming fluid injection system. This is achieved by a coolant sensor which transmits a signal to energize the heater only if the engine coolant temperature is less than a threshold level, and a lubricating oil pressure sensor that prevents the heater from being energized unless the lubricating oil pressure is at a level corresponding to a running engine condition, or at least to cranked engine condition. Time delay components in the device limit the length of the heating cycle, and inhibit the priming fluid injection system, if any, against operation until after the heater elements have cooled down so as to prevent ignition of the highly volatile and inflamable priming fluid in the intake manifold.

The many objects and advantages of the invention will become readily apparent to those skilled in the art to which the invention pertains upon reference to the following detailed description.

DESCRIPTION OF THE DRAWING

The description refers to the accompanying simplified schematic drawing of a preferred embodiment of the invention.

DESCRIPTION OF THE PREFERRED EMBODIMENT

The drawing illustrates, in a very schematic manner, a conventional diesel engine generally designated at 10. The diesel engine 10 has a liquid coolant system and a pressure lubrication system, not shown. Normally, the coolant liquid in the cooling system is relatively cool, after the engine has been off for a period of time. The temperature of the coolant progressively increases after the engine has been started and is running, while the oil pressure of the lubricating oil system is substantially nil with the engine stopped and increases suddenly to a high and steady value when the engine is started.

The engine 10 has an intake manifold 12 for receiving air for forming a combustible mixture with the diesel fuel injected in the engine combustion chamber, not shown. A built-in, electrically-energized heater 14 in the intake manifold 12 is adapted to heat the incoming air, after cold start. An electrically-energized primer injector 16 is adapted to inject ether, or another highly volatile priming fluid, either automatically or manually into the intake manifold 12, during cold start.

The control circuit of the invention, generally indicated at 18, is adapted to enable, or inhibit, as conditions require, and to properly time the operation of the manifold heater 14 and of the primer injector 16. The control circuit 18 has a terminal a connected to the positive, or +B terminal, of a DC power supply, such as a battery 20, a terminal b connected to the manifold heater 14, a terminal c connected to an annunciator such as a light 27 and a terminal d connected to the primer injector 16. A terminal e of the control circuit 18 is connected to a coolant temperature sensor 22 disposed in the coolant jacket of the engine 10, and a terminal f is connected to the motor vehicle, or engine, ground through a pressure actuated switch 24 disposed in the lubricating oil circulation system of the engine 10.

The control circuit 18 is insulated from the vehicle or engine ground, and all the ground returns of the components of the control circuit 18 is effected via terminal f. A terminal g is connected to the +B terminal of the battery 20 via the "ignition" switch 26.

A transistor T3 is connected across the terminals a and d of the circuit 18. The transistor T3 is therefore constantly connected between the +B terminal of the battery 20 and the priming fluid injector 16, and its emitter-collector circuit is normally in a conductive state such that electrical power can be applied to the primer injector 16, which enables the engine operator to inject one or more shots of priming fluid into the intake manifold 12 of the engine 10.

In the event of a cold start, when it is desired to operate the intake manifold heater 14, the switch 26 is closed and the engine is cranked. Starting the engine 10 starts circulation of the lubricating oil in the lubricating system of the engine, in turn causing an increase of the lubricating oil pressure above atmospheric pressure. The increase in lubricating oil pressure causes the oil pressure actuated switch 24 to close, thus providing a return path to the motor vehicle or engine ground for the ground returns of the other components of the control circuit 18, when the +B terminal of the battery 20 is connected through the closed switch 26 to the terminal g of the control circuit 18, thus enabling the control circuit to become operative.

The control circuit 18 further comprises a capacitor C1 connected across the terminal f of the control circuit 18 and the +B terminal g of the circuit, through a polarity-reversal preventing diode D1 and a limiting resistor R1. The voltage across the capacitor C1 is applied to a terminal of a comparator Q2, while the +B voltage is also applied to a voltage divider formed by a resistor R2 and the coolant temperature sensor 22. The resulting voltage is applied to one input of a second comparator Q2 connected between the resistor R2 and the coolant temperature sensor 22. The ouputs of both comparators Q1 and Q2 are connected to the gate of a MOSFET power transistor T1 which is connected in series with the coil CR1 of a relay SR1 between +B and ground. The second input of the comparator Q1 is connected to a voltage reference through a resistor R3 and to the gate of the MOSFET transistor T1 through a resistor R4. The second input of the comparator Q2 is connected to the voltage reference. The gate of the MOSFET transistor T1 is connected through a biasing resistor R5 to the +B terminal of the voltage supply battery 20.

A capacitor C2 and a reverse connected diode D2 are connected across the coil CR1 of the relay switch SR1 for eliminating voltage spikes across the relay coil CR1 when the MOSFET transistor T1 is turned off. A resistor R6 and a capacitor C3 are connected in series between the drain of the MOSFET transistor T1 and the circuit common ground. A third comparator Q3 has one input connected between the resistor R6 and the capacitor C3, and its other input connected to the reference voltage. The reference voltage is obtained from a voltage divider consisting of resistors R7 and R8 connected across the +B terminal of the power supply or battery 20 and ground. The output of the comparator Q3 is connected through a dropping resistor R9 to the base of a transistor T2, whose collector is connected to the base of the transistor T3 whose emitter is connected to the terminal a of the control circuit 18 which, as previously mentioned and as shown in the drawing, is constantly connected to the +B terminal of the power supply 20. The base of the transistor T2 is biased by a resistor R10, and the base of the transistor T3 is connected through a biasing resistor R11 to the terminal a of the control circuit 18, i.e. to the +B terminal of the battery 20, when the normally open switch SW1 of the relay switch SR1 closes. When the switch SW1 of the relay SR1 is closed, the +B voltage is also applied to the manifold heater 14 for energizing the heater, while, simultaneously, the light indicator 27 connected to the terminal c of the control circuit 18 is turned on to give an indication that the heater 14 is on.

Further components are included in the control circuit 18, which are not represented in the simplified schematic of the drawing, such as voltage regulator elements and overload protection devices which are not necessary for a full understanding of the invention.

The operation of the control circuit 18 is as follows:

Assuming a cold start in cold weather, starting the engine starts circulation of the lubricant causing the oil pressure to close the oil pressure responsive switch 24, thus enabling the control circuit 18 by providing a ground return to the motor vehicle or engine ground, assuming that the "ignition" switch 26 is closed while the engine is being started. As the engine coolant temperature is low, the coolant temperature sensor 22 has a low resistance and a relatively low voltage is applied to the first input of the comparator Q2. As long as that voltage is lower than the reference voltage applied to the other input of the comparator Q2 a signal, appearing at the output of the comparator Q2, is applied to the gate of the MOSFET transistor T1. Simultaneously therewith, the capacitor C1 charges, and while the voltage across the capacitor C1 is below a predetermined threshold defined by the reference voltage, as dropped by the resistor R3, applied the other input of the comparator Q2, the signal appearing at the output of the comparator Q1 is applied to the gate of the MOSFET transistor T1. This biases the MOSFET transistor T1 "on", so that its drain-source circuit becomes conducting, and current flows through the coil CR1 of the relay switch SR1, thus closing the contacts SW1. Electrical power is applied to the heater 14 and simultaneously therewith the base of the transistor T3 is biased, through the resistor R11, to render the transistor T3 non-conductive, thereby inhibiting the injection of priming fluid by means of the primer injector 16. All during this time, the capacitor C3 is held discharged due to the low impedance of the circuit consisting of the drain-souce circuit of the MOSFET transistor T1 shunting the circuit of the resistor R6 and capacitor C3. Under those conditions, no signal appears at the output of the comparator C3 and the transistor T2 is conducting which, together with the drive applied through the resistor R11, keeps the transistor T3 in a non-conductance state. This in turn inhibits the priming fluid injector 16, such that priming fluid cannot be injected in the intake manifold 12 while the intake manifold heater 14 is energized.

The capacitor C1 continues to charge through the resistor R1 and, after a time delay determined by the charge current flowing through the resistor R1, the charge of the capacitor C1 reaches a predetermined threshold level, thus removing the signal at the output of the comparator Q1, and turning off the MOSFET transistor T1. As current no longer flows through the relay coil CR1 of the relay SR1, the relay switch SW1 opens, thus turning off the intake manifold heater 14. The capacitor C3 then starts charging slowly through the resistor R6 and the low impedance of the relay coil CR1. The current flowing through the relay coil CR1 is too low to energize the relay. After a predetermined time delay, as determined by the resistance of the resistor R6 and the capacitance of the capacitor C3, the voltage across the capacitor C3, which is applied to the first input of the comparator Q3, reaches a value above that of the voltage reference applied to the second input of the comparator Q3. A signal appears at the output of the comparator Q3 which is applied, through the resistor R9, to the base of the transistor T2 which is then turned off, in turn turning the transistor T3 on, the base of the transistor T3 being normally biased to conductance through the resistor R11 connected to the vehicle or engine ground through the low impedance of the heating elements of the manifold heater 14. As the transistor T3 is now conducting, the operation of the primer injector 16 is enabled.

The second time delay during which the capacitor C3 slowly charges allows sufficient time for the manifold heater 14 to cool down before the primer injector 16 is enabled. This prevents the highly volatile priming fluid from coming into contact with the heater hot elements and causing an engine induction fire or explosion. Consequently, not only the primer injector 16 cannot be operated while the manifold heater 14 is energized, but the operation of the primer injector 16 is delayed until sufficient time has elapsed to permit the intake manifold heater 14 to cool down.

In the event of a hot start, the temperature of the engine coolant is still relatively high such that the voltage applied to the first input of the comparator Q2 is higher than the reference voltage applied to the second input of the comparator Q2. Therefore, there is no signal appearing at the output of the comparator Q2, the MOSFET transistor T1 remains turned off and the inlet manifold heater 14 remains de-energized. Consequently, under hot start conditions, the intake manifold heater cannot be energized, but the primer injector 16 remains enabled so that priming fluid may be injected in the intake manifold 14, if necessary, to facilitate starting.

In the event of a cold start, as long as the coolant temperature is below a predetermined temperature level, as previously explained, the intake manifold heater 14 may be turned on. However, as soon as the coolant temperature reaches a certain threshold value, the heater 14 is automatically turned off. Thus, in effect the outputs of the comparators Q1 and Q2 are added together so that the heater 14 is turned off when either the temperature of the coolant has reached a predetermined threshold or the capacitor C1 has charged to a predetermined voltage, whichever occurs first.

From the preceding description, it will be appreciated by those skilled in the art that the invention is an apparatus and method for controlling a diesel engine inlet air heater and priming fluid injection system. The intake manifold heater can be operated for a predetermined period of time only when the engine is running and the temperature of the engine coolant is below a predetermined level, which is an indication of a relatively cool engine. In addition, the priming fluid injection system cannot be operated unless the intake manifold heater is off and until a predetermined time after the heater has been turned off.

Having thus described the present invention by way of an example of structure well designed to fulfill the objects of the invention, modifications whereof will be apparent to those skilled in the art, what is claimed as new is as follows:

1. In combination with a diesel engine having an intake manifold provided with an electrical heater for heating incoming air through said intake manifold and a primer injector for injecting a priming fluid in said intake manifold, said engine having an oil pressure lubrication system and a coolant circulation system, control means comprising oil pressure sensor means and means inhibiting operation of said heater unless said oil pressure sensor means detects a predetermined oil pressure indicating circulation of lubricant in said oil pressure lubrication system.

2. The control means of claim 1 further comprising coolant temperature sensor means and means enabling operation of said heater below a predetermined temperature of said coolant and inhibiting operation of said heater above said predetermined temperature.

3. The control means of claim 1 further comprising means inhibiting operation of said primer injector when said heater is activated.

4. The control means of claim 2 further comprising means inhibiting operation of said primer injector when said heater is activated.

5. The control means of claim 1 further comprising first delay means inhibiting operation of said heater beyond a predetermined time period.

6. The control means of claim 2 further comprising first delay means inhibiting operation of said heater beyond a predetermined time period.

7. The control means of claim 3 further comprising first delay means inhibiting operation of said heater beyond a predetermined time period.

8. The control means of claim 4 further comprising first delay means inhibiting operation of said heater beyond a predetermined time period.

9. The control means of claim 1 further comprising delay means inhibiting operation of said primer injector for a predetermined period of time after said heater has been de-energized.

10. The control means of claim 2 further comprising delay means inhibiting operation of said primer injector for a predetermined period of time after said heater has been de-energized.

11. The control means of claim 3 further comprising delay means inhibiting operation of said primer injector for a predetermined period of time after said heater has been de-energized.

12. The control means of claim 4 further comprising delay means inhibiting operation of said primer injector for a predetermined period of time after said heater has been de-energized.

13. The control means of claim 5 further comprising delay means inhibiting operation of said primer injector for a predetermined period of time after said heater has been de-energized.

14. The control means of claim 6 further comprising delay means inhibiting operation of said primer injector for a predetermined period of time after said heater has been de-energized.

15. The control means of claim 7 further comprising delay means inhibiting operation of said primer injector for a predetermined period of time after said heater has been de-energized.

16. The control means of claim 8 further comprising delay means inhibiting operation of said primer injector for a predetermined period of time after said heater has been de-energized.

17. A method for starting a diesel engine having an intake manifold provided with an electrical heater for heating incoming air through said intake manifold and a primer injector for injecting a priming fluid in said intake manifold, said engine having an oil pressure lubrication system and a coolant circulation system, said method comprising sensing said oil pressure, and inhibiting operation of said heater unless said oil pressure is a predetermined oil pressure indicating circulation of lubricant in said oil pressure lubrication system.

18. The method of claim 17 further comprising sensing the temperature of said coolant, enabling operation of said heater below a predetermined temperature of said coolant, and inhibiting operation of said heater above said predetermined temperature.

19. The method of claim 17 further comprising inhibiting operation of said primer injector when said heater is energized.

20. The method of claim 18 further comprising inhibiting operation of said primer injector when said heater is energized.

21. The control means of claim 17 further comprising stopping operation of said heater beyond a predetermined time period.

22. The method of claim 18 further comprising stopping operation of said heater beyond a predetermined time period.

23. The method of claim 19 further comprising stopping operation of said heater beyond a predetermined time period.

24. The method of claim 20 further comprising stopping operation of said heater beyond a predetermined time period.

* * * * *